(12) United States Patent
Spencer et al.

(10) Patent No.: US 8,545,154 B2
(45) Date of Patent: Oct. 1, 2013

(54) LICENSE PLATE FASTENER

(75) Inventors: Todd Spencer, Monument, CO (US);
Eldon Goates, Colorado Springs, CO (US); Mary Knoer, Monument, CO (US); Bret Zelenka, Monument, CO (US)

(73) Assignee: Cruiser Accessories, LLC, Monument, CO (US)

( * ) Notice: Subject to any disclaimer, the term of this patent is extended or adjusted under 35 U.S.C. 154(b) by 196 days.

(21) Appl. No.: 13/089,086

(22) Filed: Apr. 18, 2011

(65) Prior Publication Data

US 2012/0263557 A1 Oct. 18, 2012

(51) Int. Cl.
*F16B 35/00* (2006.01)
*G09F 7/00* (2006.01)

(52) U.S. Cl.
USPC ............................................. 411/338; 40/209

(58) Field of Classification Search
USPC ................... 411/338, 432, 903, 546; 40/200, 40/209
See application file for complete search history.

(56) References Cited

U.S. PATENT DOCUMENTS

| | | | | |
|---|---|---|---|---|
| 2,138,176 | A * | 11/1938 | Keys | 248/613 |
| 2,969,831 | A * | 1/1961 | Eames | 403/265 |
| 4,447,055 | A * | 5/1984 | Ahrens | 482/35 |
| 4,490,083 | A * | 12/1984 | Rebish | 411/338 |
| 5,290,131 | A * | 3/1994 | Henriksen | 411/180 |
| 6,287,064 | B1 * | 9/2001 | Jhumra et al. | 411/175 |
| 7,210,255 | B2 * | 5/2007 | Blackburn | 40/209 |
| 7,713,012 | B2 | 5/2010 | Coonjohn | |
| D631,415 | S | 1/2011 | Spencer | |
| 7,877,908 | B2 | 2/2011 | Collins | |

* cited by examiner

*Primary Examiner* — Flemming Saether
(74) *Attorney, Agent, or Firm* — Dan Cleveland, Jr.; Lathrop & Gage LLP

(57) ABSTRACT

A license plate fastener assembly includes a female collar including an internally threaded cylinder and a radially outboard flared shoulder. A bumper is mounted on the shoulder. A bolt is compatibly received in the threaded cylinder. The bolt presents a bolt head to define a selectively adjustable distance between the bolt head and the bumper. One or more washers made or synthetic resin may be mounted on the cylinder for selective depth adjustment of the distance.

5 Claims, 5 Drawing Sheets

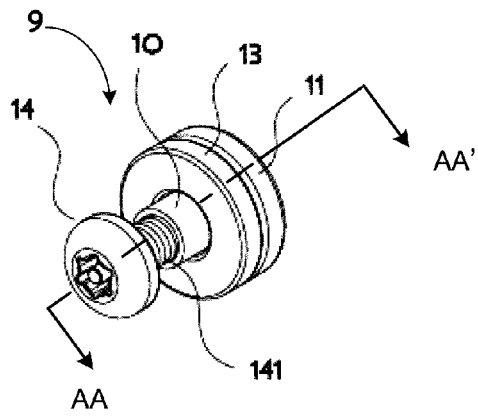
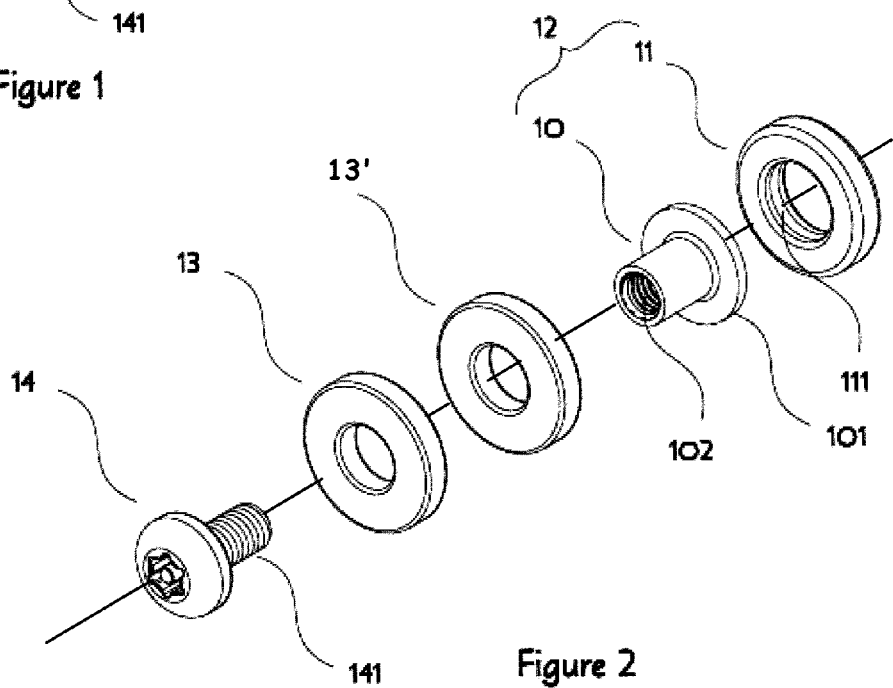
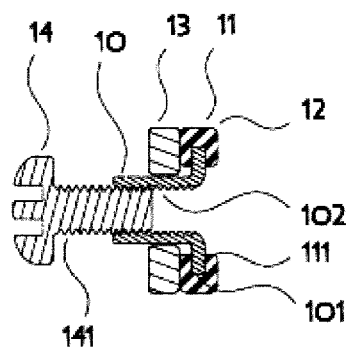

LICENSE PLATE FASTENER

BACKGROUND

A variety of threaded fasteners are used to attach license plates to automobiles or trucks. The arrangement may be as simple as a nut and a bolt. Other fasteners are provided with decorative heads, for example, as shown in U.S. Pat. No. 7,713,012 issued to Coonjohn. The threaded fasteners may in some instances be provided with clip receptacles for attachment of a removable frame that assist in retaining the license plate, as shown in U.S. Pat. No. 7,877,908 issued to Collins. Still other frames are made to bolt on using the same threaded fasteners as retain the license plate, for example, as shown in U.S. Design Pat. No. D631,415 issued to Spencer et al.

It is problematic that the license plates, which are sometimes used in conjunction with these frames, may vibrate and create undesirable noise as the vehicle is being driven. This may sometimes occur even if the fastener is fully tightened, as portions of the license plate and frame distort between the fasteners to collide with adjacent structure.

SUMMARY

The presently disclosed instrumentalities overcome the problems outlined above and advance the art by providing a license plate fastener that reduces the incidence of vibration and unwanted noise.

The license plate fastener assembly includes a female collar including an internally threaded cylinder and a radially outboard flared shoulder. A bumper is mounted on the shoulder. A bolt is compatibly received in the threaded cylinder. The bolt presents a bolt head to define a selectively adjustable distance between the bolt head and the bumper. One or more washers made or synthetic resin may be mounted on the cylinder for selective depth adjustment of the distance.

In use, a user identifies a hole in the license plate at one of an upper level or a lower level of the license plate. A shoulder of a first fastener assembly is inserted through a hole in the license plate with the bumper positioned at the rear of the license plate. The bolt is threaded into the cylinder and tightened to secure the first assembly in place. This process is repeated using a second fastener assembly and a second hole at the same level of the license plate. Two holes at the other level of the license plate are used to attach the license plate to an automobile by conventional threaded fasteners. In this position, the collar abuts the automobile and so damps vibration of the license plate.

In other aspects, an optional license plate frame may be placed over the license plate for attachment therewith to the automobile. An optional protective license plate cover may be placed between the license plate frame and the license plate for attachment therewith to the automobile.

BRIEF DESCRIPTION OF THE DRAWINGS

FIG. 1 shows a threaded fastener assembly according to one embodiment of what is shown and described herein;

FIG. 2 is an assembly view of the threaded fastener assembly of FIG. 1;

FIG. 3 is a midsectional view of the threaded fastener assembly taken along line AA-AA' of FIG. 1;

DETAILED DESCRIPTION

Figure 4:
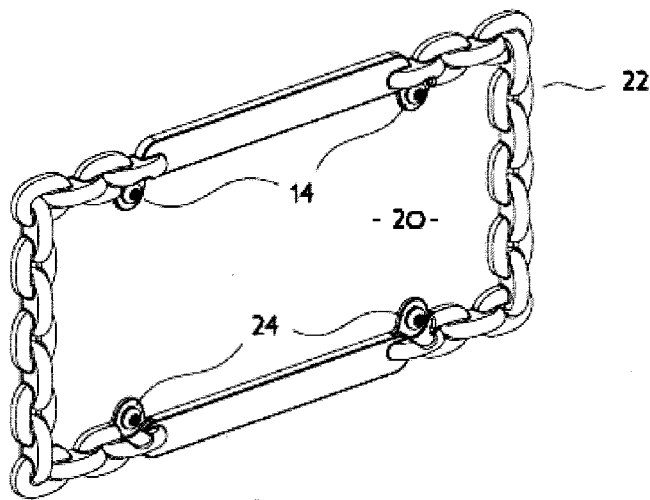
FIG. 4 shows the threaded fastener assembly of FIG. 1 in use to retain a license plate and a license plate frame.

There will now be shown details of the presently disclosed instrumentalities. This teaching is by way of nonlimiting example to illustrate the preferred embodiments. The respective figures maintain identical numbering as applied to identical parts.

FIG. 1 shows a fastener assembly 9. An internally threaded female collar 10 is integrally formed with or bonded to a bumper 11. A washer 13 is preferably made of plastic or hard rubber. A star-key bolt 14 threads into the female collar 10.

As shown in the assembly view of FIG. 2, there may be optionally a plurality of identical washers 13, 13'. An assembly 12 includes the female collar 10 and the bumper 11. By way of example, the female collar 10 may be made of metal, and the bumper 11 may be plastic or rubber molded such that a radially outboard flared shoulder 101 fits within radial groove 111 of bumper 11. Section 102 is an internally threaded cylinder that is integrally formed with shoulder 101. FIG. 3 is a midsectional view taken along line AA-AA' of FIG. 1 showing the position of shoulder 101 within groove 111.

Figure 5:
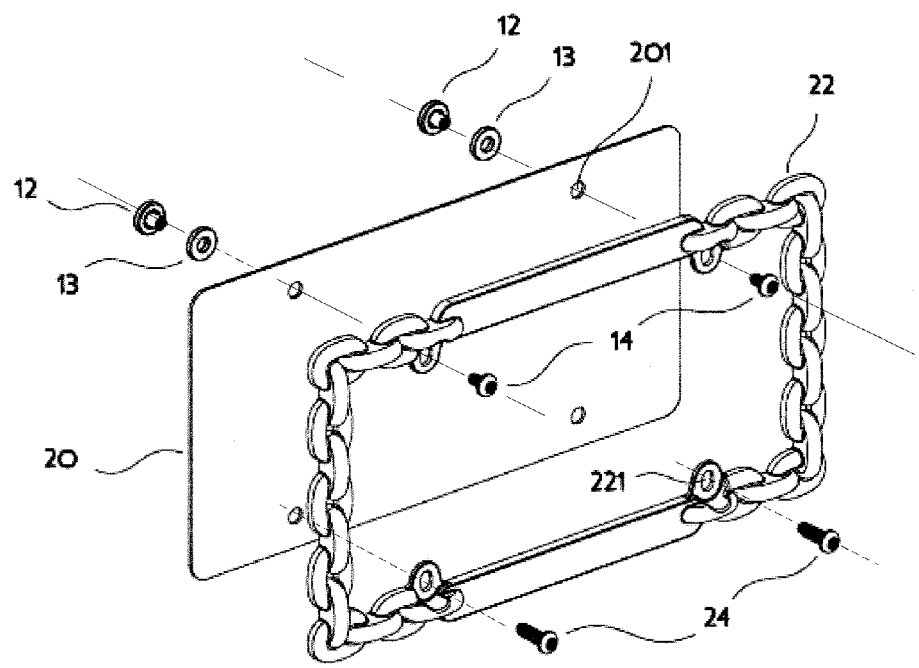
FIG. 5 is an assembly view for the respective components of FIG. 4.

FIG. 4 shows a license plate 20 and a decorative license plate frame 22 that is retained at the top by a plurality of threaded fastener assemblies 14 and at the bottom by a plurality of threaded fasteners 24 known to the prior art. Alternatively, the fasteners 24 may be of the type shown in FIG. 1, which is not in the prior art. As shown in the assembly view of FIG. 5, the washers 13 are deployed rearward of the license plate 20.

Figure 6:
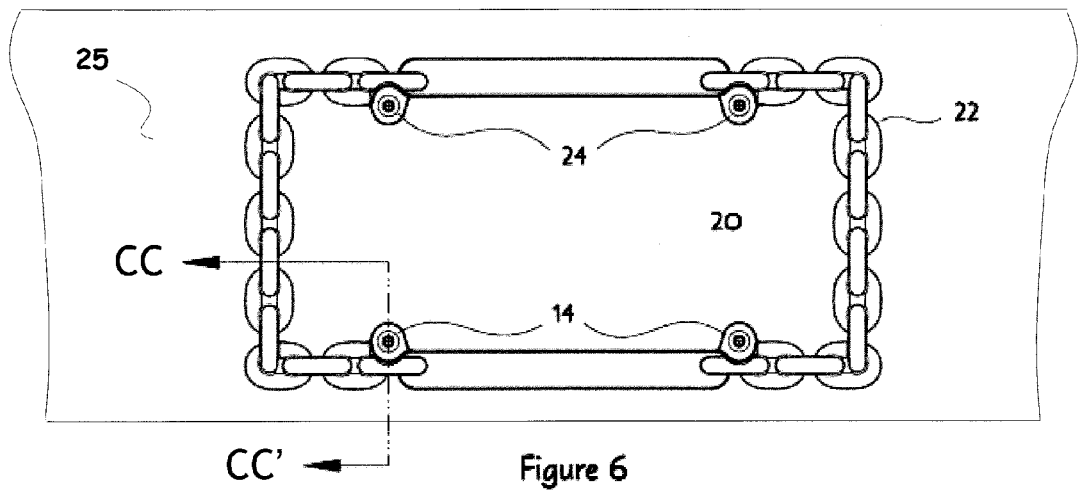
FIG. 6 shows the threaded fastener assembly of FIG. 1 in use to retain a license plate and a license plate frame.

FIG. 6 shows the converse of FIG. 4 where the fasteners 14 are located at the bottom and the fasteners 24 at the top. It will be appreciated that the fasteners 24 attach the license plate 20 to structure on an automobile, such as an automotive bumper 25.

Figure 7:
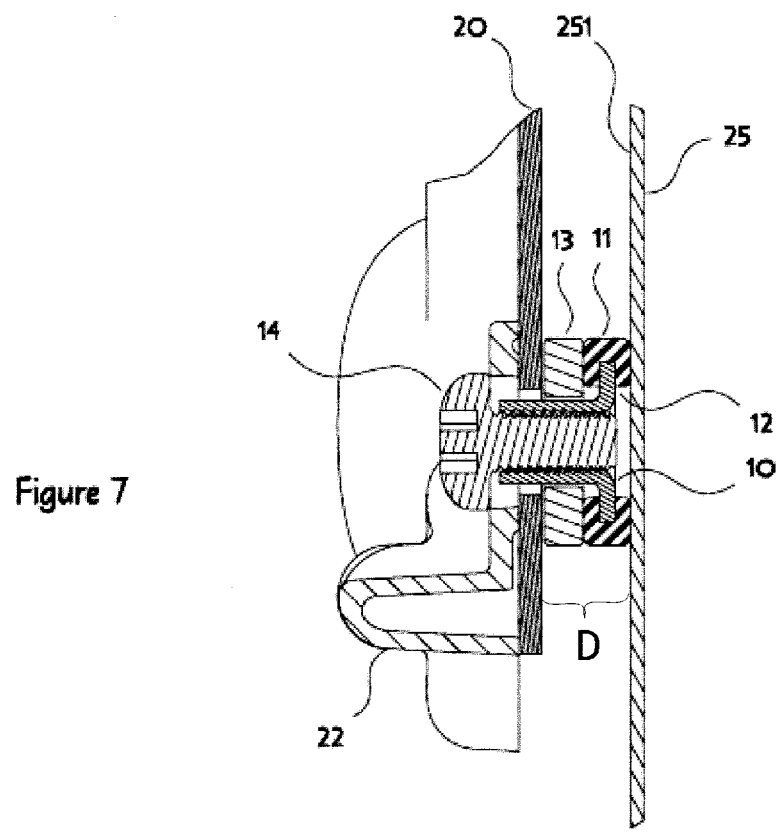
FIG. 7 is an assembly view for the respective components of FIG. 6.

The bumper 11 then inhibits rattling of license plate 20 as shown in FIG. 7. FIG. 7 is a midsectional view taken along line CC-CC' of FIG. 6. The rearward deployment of washer 13 increases a distance D between the license plate 20 and license plate mounting structure 251, such as a bumper or mounting frame that is conventionally used to present the attached license plate. The mounting plate structure 251 abuts surface 11a of bumper 11.

Figure 8:
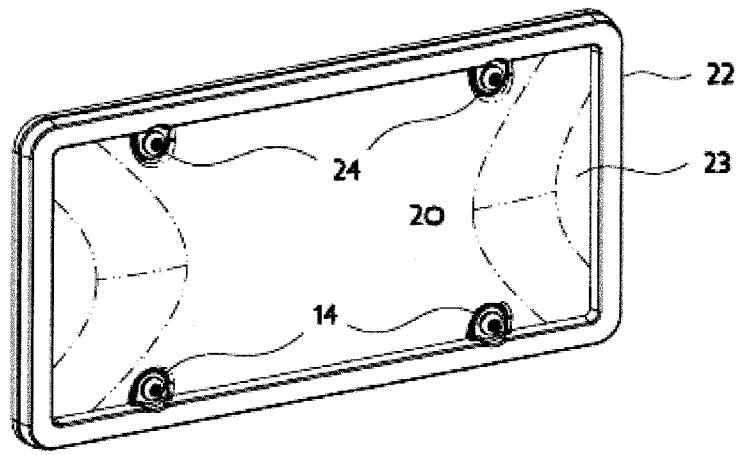
FIG. 8 is a perspective view showing selected components of the threaded fastener assembly of FIG. 1 in use to retain a license plate, a license plate frame and a protective license plate cover.
Figure 9:
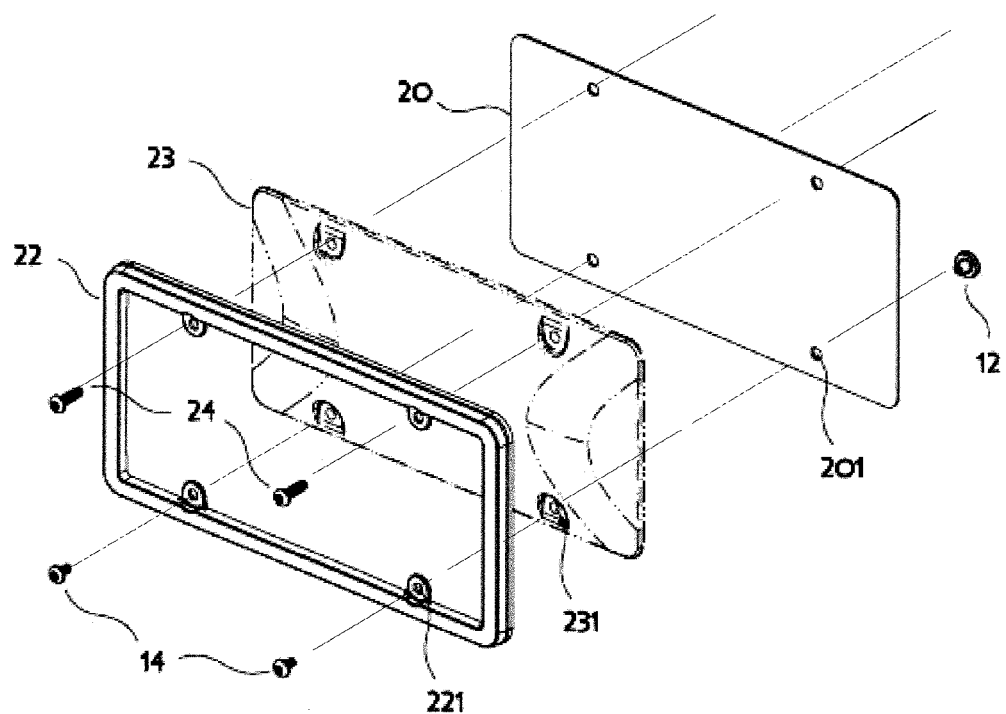
FIG. 9 is an assembly view for the respective components of FIG. 8.

FIG. 8 shows an embodiment like that of FIG. 6, except a clear protective cover 23 is interposed between the license plate 20 and the license plate frame 22. In this embodiment, the washer 13 is not required and may be eliminated to compensate for the increased thickness of the protective cover 23. Considering FIG. 9, it will be appreciated that one of the bolts 14 extends through apertures 221, 231 and 201 to meet the female collar 10 without the provision of washers 13 or 13'.

Figure 10:
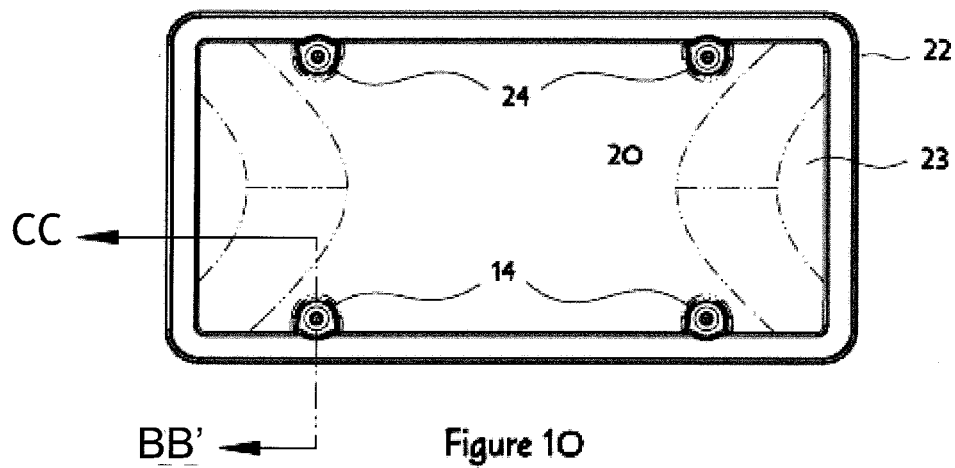
FIG. 10 is a front view of the assembly shown in FIG. 8.
Figure 11:
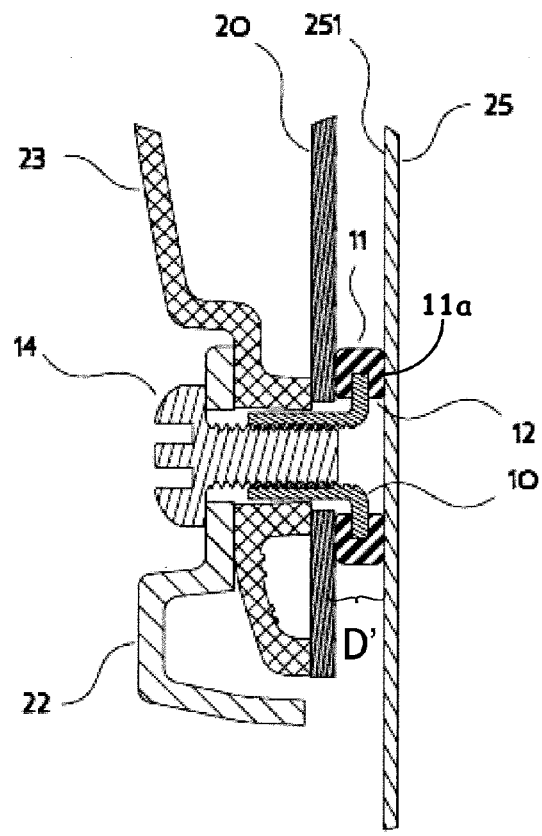
FIG. 11 is a midsectional view taken along line BB-BB' of FIG. 10.

FIG. 10 is a front view of the embodiment shown in FIG. 8. FIG. 11 is a midsectional view taken along line BB-BB' of FIG. 10. Due to the absence of washer 13, the distance D' is less than distance D and constitutes the thickness of Bumper 11.

It will be appreciated that modifications may be made to what is shown and described above without departing from the scope and spirit of the invention. For example, although star-key heads are preferred, bolt 14 may be any type of bolt. The additional washer 13' may be used to compensate for the reduction of thickness if the protective cover 23 and the license plate frame are removed. As to other insubstantial changes, the inventors hereby state their intention to rely upon the doctrine of Equivalents if needed to protect their full rights in the invention.

We claim:

1. A license plate fastener assembly comprising:
    a female collar including an internally threaded cylinder and a radially outboard flared shoulder;
    a bumper mounted on the shoulder;
    a washer mounted externally on the threaded cylinder of the female collar;
    a bolt compatibly received in the threaded cylinder, the bolt having a head and an externally threaded male member received within the female collar; and
    a license plate frame retained between the head of the bolt and the washer.

2. The assembly of claim 1, the bolt presenting a bolt head and there being a distance between the bolt head and the bumper,
    further comprising one or more washers made or synthetic resin mounted on the cylinder for selective depth adjustment of the distance.

3. A method of mounting a license plate with use of the assembly of claim 1, comprising steps of:
    (a) identifying a hole in the license plate at one of an upper level or a lower level of the license plate;
    (b) inserting the shoulder of a first assembly through a hole in the license plate with the bumper to the rear of the license plate;
    (c) threading the bolt into the cylinder;
    (d) tightening the bolt to secure the first assembly in place;
    (e) repeating steps (a) through (d) using a second assembly and a second hole at the same level of the license plate; and
    (f) attaching the license plate to an automobile by insertion of threaded fasteners through one or more holes at the other of the upper level or the lower level of the license plate.

4. The method of claim 3 further comprising placing a license plate frame over the license plate for attachment therewith to the automobile.

5. The method of claim 4 further comprising inserting a protective license plate cover between the license plate frame and the license plate for attachment therewith to the automobile.

* * * * *